United States Patent [19]

McMillan

[11] Patent Number: 5,449,987
[45] Date of Patent: Sep. 12, 1995

[54] WINDOW OPERATOR CONTROL

[75] Inventor: Scott D. McMillan, Owatonna, Minn.

[73] Assignee: Truth Division of SPX Corporation, Owatonna, Minn.

[21] Appl. No.: 126,260

[22] Filed: Sep. 24, 1993

[51] Int. Cl.⁶ .............................................. H02P 1/04
[52] U.S. Cl. ................................... 318/266; 318/285
[58] Field of Search ............................. 318/280–286,
318/265, 266, 466–469; 49/26, 29, 30, 138;
160/29, 291, 292, 293.1, 296

[56] References Cited

U.S. PATENT DOCUMENTS

| | | | |
|---|---|---|---|
| 3,337,992 | 8/1967 | Tolson | 49/29 |
| 4,401,929 | 8/1983 | Odaka et al. | 318/466 |
| 4,498,033 | 2/1985 | Aihara et al. | 318/265 X |
| 4,514,670 | 4/1985 | Fassel et al. | 318/266 X |
| 4,933,613 | 6/1990 | Berner et al. | 318/65 |
| 5,315,220 | 5/1994 | Takimoto et al. | 318/282 |

Primary Examiner—William M. Shoop, Jr.
Assistant Examiner—Brian Sircus
Attorney, Agent, or Firm—Wood, Phillips, VanSanten, Clark & Moritmer

[57] ABSTRACT

An improved window operator has an electrically controlled drive for moving a window between opened and closed positions in response to a command. A plurality of switches are provided for manually or remotely commanding movement of the drive to move the window to a select desired position between the opened and closed positions. A position sensing routine senses actual position of the window between the open and closed positions. The position sensing routine includes a timer for storing a value representing actual position. The value is selectively incremented or decremented at a select rate in response to duration of operation of the drive to move the window between the open and closed positions. The control senses electrical power supplied to the drive. An adjustment routine adjusts the select rate of the timer in response to electric power deviating from a select desired power level. The control compare the desired position to actual position and controls an output coupled to the drive for developing an electrical signal to control the drive in response to a difference between the select and actual positions to minimize the difference.

5 Claims, 10 Drawing Sheets

WINDOW OPERATOR CONTROL

FIELD OF THE INVENTION

This invention relates to window operators and, more particularly, to an improved control for a window operator.

BACKGROUND OF THE INVENTION

A window typically includes a fixed frame and a movable sash. The sash is usually mounted either for slidable movement relative to the frame or is hinged for pivotal movement, to open or close the window. One example of such a window is a casement window. A casement window is typically provided with a window operator to aid in manually opening and closing the window. An example of such a window operator is shown in Tucker, U.S. Pat. No. 4,840,075, owned by the assignee of the present application. Such a window operator includes a rotatable shaft driving a linkage mechanism for selectively moving the sash relative to the frame to open or close the window. A handle is secured to the shaft using a set screw for ease of operation.

In addition to the described casement window operator, various forms of window operators have been used for awning type windows in which the operator also includes a rotatable shaft. Similarly, certain skylight windows include a skylight window operator such as shown in Tacheny et at., U.S. Pat. No. 4,521,993, also owned by the assignee of the present application. A skylight window operator also includes a rotatable shaft normally driven by a pole. The skylight window operator can also be used in connection with a double hung window in which the sash is slidably mounted in the frame, as by the window operator chain raising and lowering the sash.

Each of the described window operators is well suited for its intended application. Nevertheless, with skylight windows the use of a manual operator may be problematic due to inaccessibility of the operator. To satisfy these concerns, motorized window operators have been used for skylight window operators, such as disclosed in the above-mentioned Tacheny et at. application, as well as Berner et at. U.S. Pat. No. 4,945,678, also owned by the assignee of the present application.

Having found success with motorized skylight window operators, there exists a desire to provide motorized operators for other types of windows, such as casement windows, awning windows or double hung windows. In connection with such desires, it is important to consider the millions of such window operators already installed and in use for which such motorized functionality is desired. To satisfy this desire, a motorized drive for a manual window operator has been developed as described in an application to Midas, entitled "Powered Window Operator Drive", U.S. Ser. No. 08/019,243, filed Feb. 18, 1993 now U.S. Pat. No. 5,313,737, the specification of which is hereby incorporated by reference herein. With such a drive, or any motorized window operator, it is necessary to provide a control therefor.

Further, it has been found desirable to provide locking structures which are not operated manually by the occupant of the room, but rather are operated by an electric motor or the like. One such lock is described in an application to Spinar, entitled "Window Lock", U.S. Ser. No. 08/019,099, filed Feb. 18, 1993, the specification of which is hereby incorporated by reference herein. Again, with such a window lock, it is necessary that a suitable control be provided therefor.

With motorized window operators and motorized locks proper sequencing of each must be utilized to prevent damage. For example, the lock must be opened prior to opening the window. Conversely, the window must be closed prior to closing the lock. To satisfy market demand, such a control must be economical.

Often, a room may include a series of windows having motorized operators. Advantageously, all such windows must be capable of being controlled from a single control. Again, a need exists that such a control be economical.

To accurately control movement of a window, the control circuit must have information representing current position. This can be done using mechanical-type sensors providing feedback information representing actual movement of the window. Alternatively, a control can use a timing circuit for timing length of motor operation as representing actual movement of a window. Doing so may result in measurement errors. For example, if a window is open under lower than normal line voltage conditions, the motor would run slower and not open as far as normal. This would result in an error in the timer value representing actual position. When the window is subsequently closed, a motor current rise would be sensed before the timer circuit indicates that the window should be closed. This might be interpreted as an obstruction, causing the window to open up.

Finally, with the advent of home automation systems it is desirable to control window operators from plural sources. Doing so can present conflicts as to which commands take precedence over other commands. For example, it might be desirable to close the window when rain is sensed or to open the window when smoke is sensed. Since such commands are conflicting, there should be some procedure for determining which commands take priority.

The present invention is intended to overcome one or more of the problems set forth above in a novel and simple manner.

SUMMARY OF THE INVENTION

In accordance with the invention, there is disclosed a control for a motorized window operator including improved position sensing.

Broadly, there is disclosed herein an improvement in a window operator having an electrically controlled drive for moving a window between open and closed positions in response to a command. The improvement includes means for commanding movement of the drive to move the window to a select desired position between the open and closed positions. Position sensing means sense actual position of the window between the open and closed positions, comprising a timer means for storing a value representing actual position, the value being selectively incremented or decremented at a select rate in response to duration of operation of the drive to move the motor between the open and closed positions. Supply sensing means sense electrical power supplied to the drive. Adjustment means are operatively associated with the position sensing means and the supply sensing means for adjusting the select rate of the timer means in response to electrical power deviating from a select desired power level. A control is coupled to the commanding means and the position sensing means and includes comparing means for comparing the desired position to the actual position and output means coupled to the drive for developing and electrical signal to control the drive responsive to a difference between the select and actual position to minimize the difference.

It is a feature of the invention that the drive comprises a motor controlled drive.

It is a further feature of the invention that the output means comprises a bridge circuit for controlling polarity of power supplied to the motor dependent upon desired direction of movement of the window.

It is a further feature of the invention that the adjustment means decreases the select rate in response to decreases in sensed power and increases the select rate in response to increases in sensed power.

It is yet a further feature of the invention that the supply sensing means sensed line voltage supplied to the drive.

In accordance with another aspect of the invention there is disclosed a control for a window operator having an electrically controlled drive for moving a window between open and closed positions. The control comprises user controlled means for manually developing a manual command to move the window to a select desired position. Remote open input means for connection to an external momentary switch receive a remote open command to move the window to a select desired open position. Remote close input means for connection to an external momentary switch receive a remote close command to move the window to the closed position. Remote contact input means for connection to an external maintained switch receive an auxiliary command to move the window to the closed position or a select desired open position, according to a change in state of the maintained switch. Position sensing means sense actual position of the window between the open and closed positions. A control is operatively coupled to the user controlled means, the remote open input means, the remote close input means, and the remote contact input means, for receiving commands therefrom, and said position sensing means. The control includes desired position determining means for determining which of any received command has priority and developing a desired position command therefrom. Comparing means compare the desired position command to the actual position and output means coupled to the drive develop an electrical signal to control the drive responsive to a difference between the select and actual positions to minimize the difference.

It is a feature of the invention that the desired position determining means gives priority to a remote open command over a remote closed command.

It is another feature of the invention that the desired position determining means gives priority to a remote open command over all other received commands.

It is another feature of the invention that the desired position determining means gives priority to a manual command to open the window over the remote close command.

It is still another feature of the invention that the desired position determining means gives priority to any command to open the window from the user controlled means or the remote input means over any commands to close the window.

It is yet another feature of the invention that the desired position determining means stores an auxiliary command until no other commands are received.

Further features and advantages of the invention will be readily apparent from the specification and from the drawing.

DETAILED DESCRIPTION OF THE INVENTION

Figure 1:
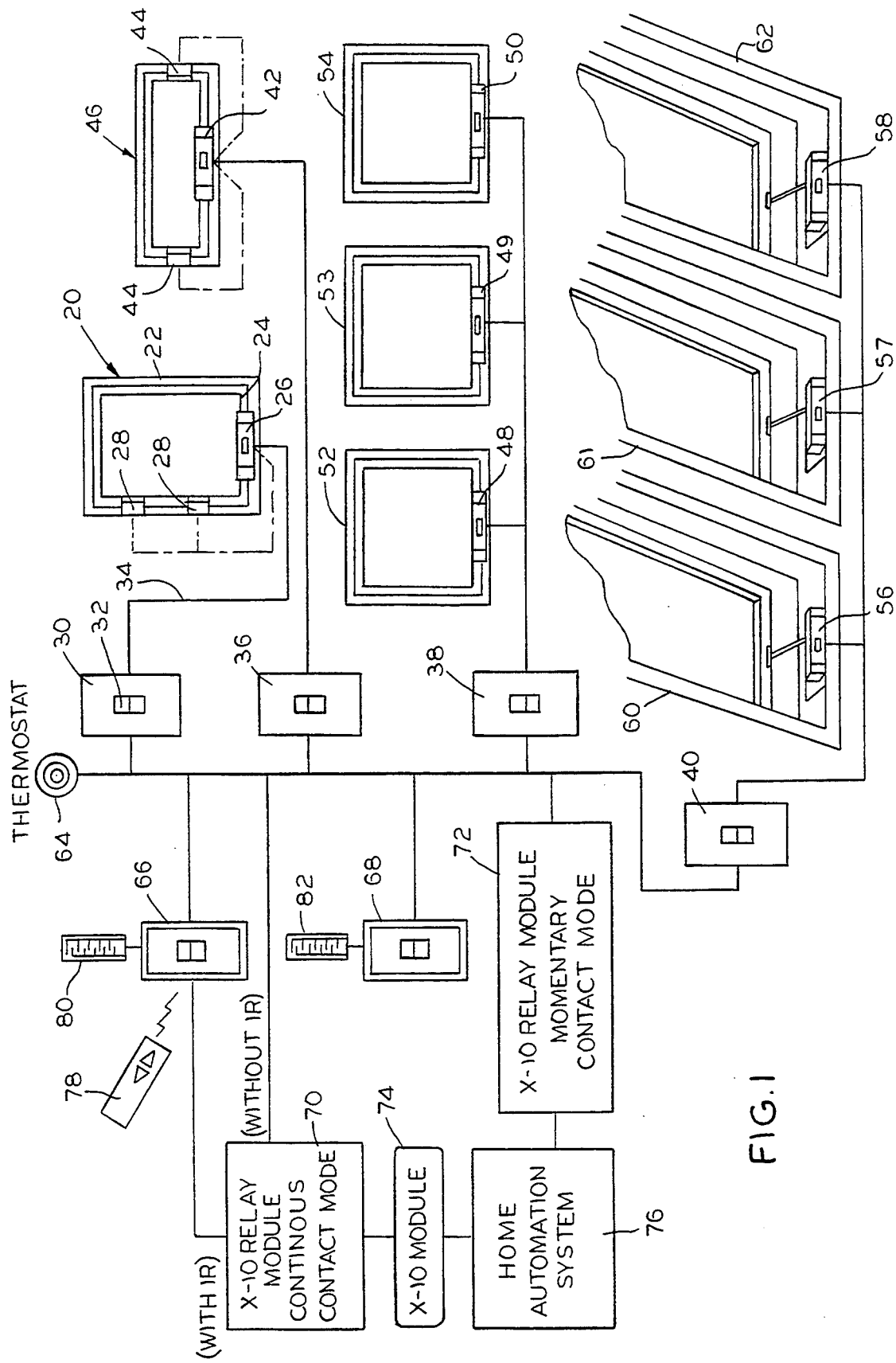
FIG. 1 is a generalized illustration showing window operators for plural type windows and a control system therefor in accordance with the invention.

With reference to FIG. 1, a plurality of different types of windows and associated window operators are illustrated, each of which can be controlled by a control in accordance with the invention.

Among the windows illustrated is a casement window 20 including a fixed frame 22 and a sash 24 supported relative to the frame 22 by hinges (not shown) along a right vertical edge. The window 20 is selectively opened or closed by a motorized window operator 26. The motorized operator 26 may comprise a window operator similar to that described in Tucker, U.S. Pat. No. 4,840,075, the specification of which is hereby incorporated by reference herein. Such a window operator 26 includes a rotatable shaft rotatable for operation of a gearing for operating a linkage mechanism connected to the sash 24. Also included with such a window operator is a motorized drive which may be similar to that described in Midas et al., application Ser. No. 08/192,243, previously incorporated by reference herein, which includes a motor and gear arrangement for driving the operator shaft to selectively open or close the window.

The window 20, in addition to the motorized window operator 26, includes a pair of motorized locks 28. These locks 28 may be similar to that described in the Spinar application Ser. No. 08/019,099 previously incorporated by reference herein. Such locks 28 mount on the window frame 22 for selectively grasping a keeper on the window sash 24 to secure the sash 24 closed against the frame 22.

Each of the motorized operator 26 and locks 28 are controlled by a wall-mounted control unit 30. The control unit 30 includes a rocker switch 32 for commanding opening or closing of the window 20 and a circuit, described below, operating in response to movement of the rocker switch 32 or remote controls, also described below, for controlling power on conductors 34 to both the motorized operator 26 and the motorized locks 28, as described below.

In accordance with the invention, additional control units 36, 38 and 40 may be provided, as necessary, for controlling operation of additional windows. Each of the control units 36, 38 and 40 is identical to the control unit 30 discussed above. The control unit 36 is used for controlling a window operator 42 and locks 44 of an awning type window 46. The control unit 38 is used for controlling window operators 48, 49 and 50, respectively, associated with casement or awning type windows 52, 53 and 54, respectively, provided without motorized locks. Finally, the control unit 40 is illustrated for controlling skylight window operators 56, 57 and 58 for controlling respective skylight windows 60, 61 and 62.

In accordance with the invention, each of the control units 30, 36, 38 and 40 is adapted to receive remote input commands for commanding opening and closing movement of the associated windows. For example, any or all of the control units 30, 36, 38 and 40 could be electrically connected to any one or more of a thermostat 64, an infrared module 66, a rain sensor module 68, a power line carrier (PLC) relay module 70 operating in a continuous contact mode, or an X-10 type relay module 72 operating in a momentary contact mode. The PLC relay module 70 is optionally connected through a PLC module 74 to a home automation system 76. The optional PLC module 74 is only needed if close and hold or open and hold features are required for the PLC relay module 70. The PLC relay module 72 is also connected to the home automation system 76.

The thermostat 76 typically includes a switch contact which is maintained in an open or closed position according to sensed temperature. The infrared module 66 includes an infrared receiver for receiving a signal from a hand-held remote control 78. The module 66 might also optionally be connected to a rain sensor 80 or the PLC relay module 70. The infrared module 66 includes open and closed switch outputs for commanding open and closed window movement, respectively, which are normally momentary in nature, but can be held.

The rain sensor module 68 is adapted to be connected to a rain sensor 82 for providing remote control to open or close the window, similar to the module 66.

Figure 2:
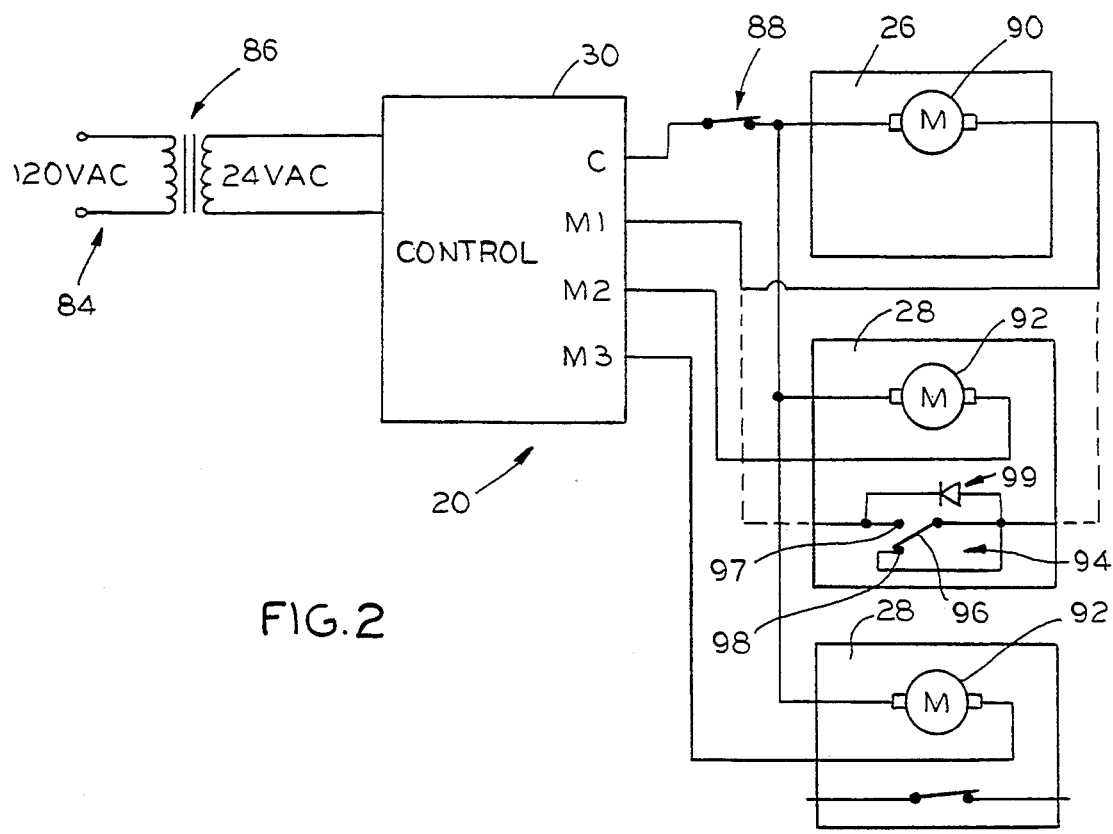
FIG. 2 is a wiring diagram illustrating interconnection of certain of the components of the system of FIG. 1.

With reference to FIG. 2, a generalized schematic/block diagram illustrates the installation for the window 20 of FIG. 1. The control unit 30 receives power from a conventional 120 volt supply 84 through a transformer 86 to provide a 24 volt AC, class 2 circuit. The transformer 86 is connected to the control unit 30. The control unit 30 includes four outputs, one of which, labeled "C", is a common. The other outputs, labeled "M1", "M2" and "M3", comprise power outputs for driving up to three motors. In the illustrated embodiment, the control unit 30 is connected to the motorized operator 26 and the two locks 28.

The common output C is connected to a screen interlock 88. The screen interlock 88, which is not shown in FIG. 1, comprises a shorting bar which senses presence or absence of a window screen. Particularly, such an interlock is used to prevent opening of the window 20 if the screen is not present. This interlock is optional. The screen interlock contact 88 is in turn connected to a common side of a motor 90 for the motorized operator 26, and a motor 92 for each of the locks 28. The opposite side of the operator motor 90 is connected to the M1 output. The opposite sides of the motors 92 for the window locks 28 are connected to the remaining outputs M2 and M3, as shown.

The lock 28 used in the illustrated embodiment of the invention also includes a control switch 94 (one of which is shown). The control switch 94 includes a movable contact 96 and first and second fixed contacts 97 and 98. When the window is open (i.e., there is no keeper in the lock 28), the movable contact 96 is in contact with the first fixed contact 97. When the window is closed (i.e., there is a keeper in the lock 28), then the movable contact 96 is in contact with the second fixed contact 98. The second fixed contact 98 is connected, through a diode 99 to the first fixed contact 97. The control switch 94 is used to provide a shut-off for the operator motor 90 as by connecting the operator motor through the control switch 94 to the M1 output. This is used to stop the motorized operator 26 once the window sash 24 is moved to a closed position, as described below. The diode 99 allows reverse polarity power to be connected to the operator motor 90 in order to open a window.

Figure 3:
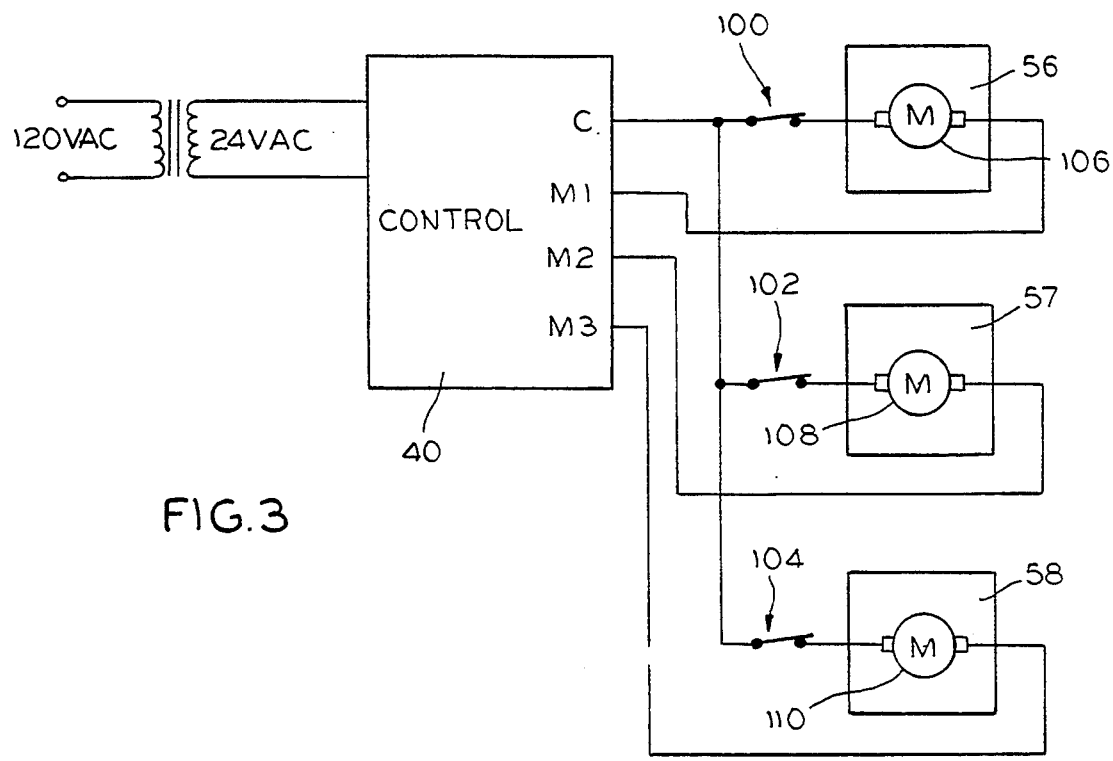
FIG. 3 is a wiring diagram similar to FIG. 2 illustrating interconnection of the components for other portions of the system of FIG. 1.

With reference to FIG. 3, an illustration similar to that of FIG. 2 shows connection of the control unit 40 to the window operators 56, 57 and 58. For this application, the common output C is connected to the screen interlocks 100, 102 and 104 for each window, 60, 61 and 62, respectively, which is in turn connected to its associated operator motor 106, 108 and 110. The opposite sides of the motors 106, 08 and 110 are in turn connected to the respective motor control outputs M1, M2 and M3.

In accordance with the invention, any of the control units 30, 36, 38 and 40 can sense whether the device connected to any motor output M1, M2 or M3 is a motorized window operator or a motorized lock and adjust the control sequence accordingly.

For the remainder of the specification, reference will be made to the control unit 30, it being understood that the circuits and software for the control units 36, 38 and 40 are identical and only the particular application for which the control unit is used differs.

Figure 4A:
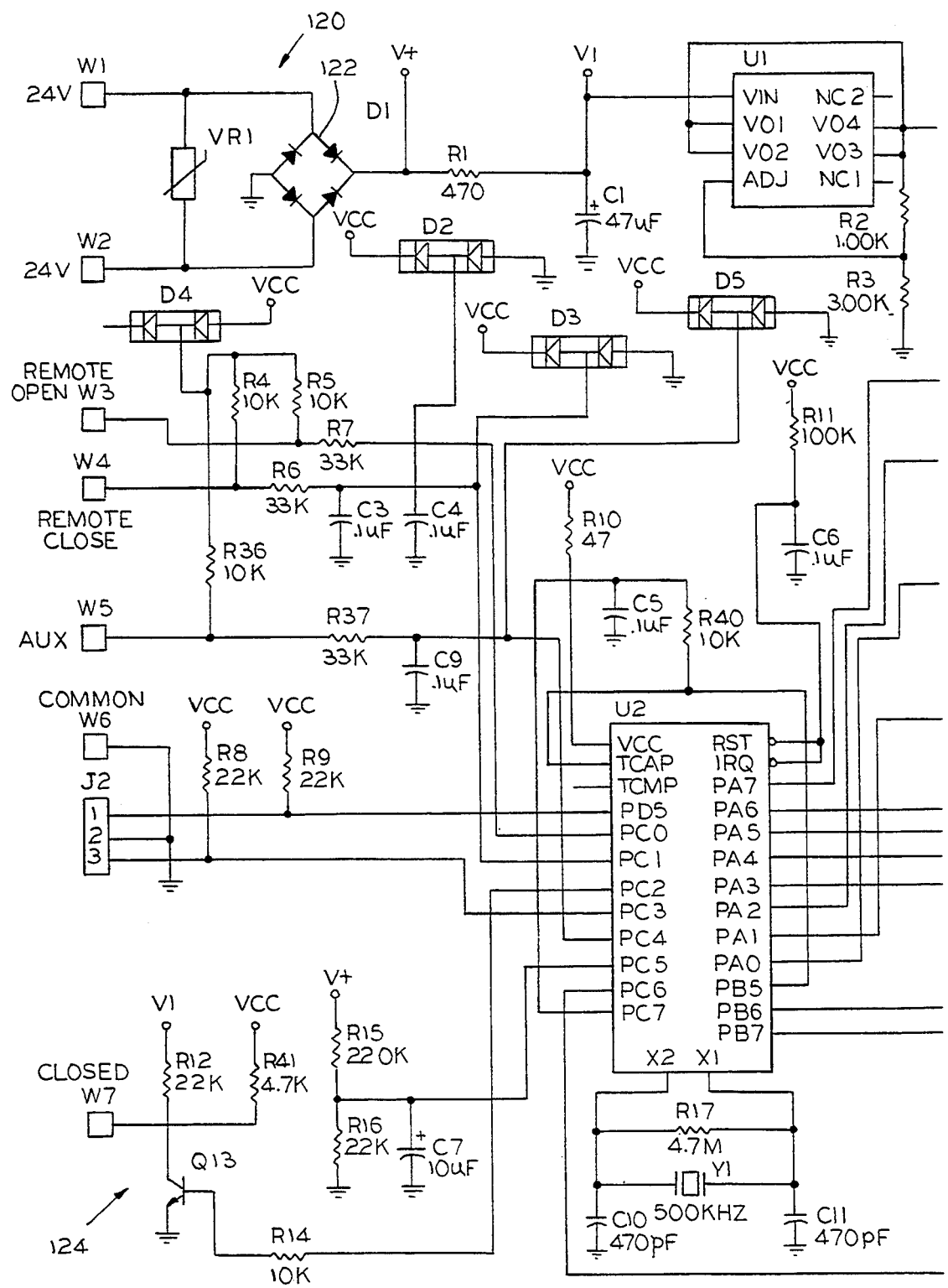
FIG. 4 is an electrical schematic for the control of the window system of FIG. 1.
Figure 4B:
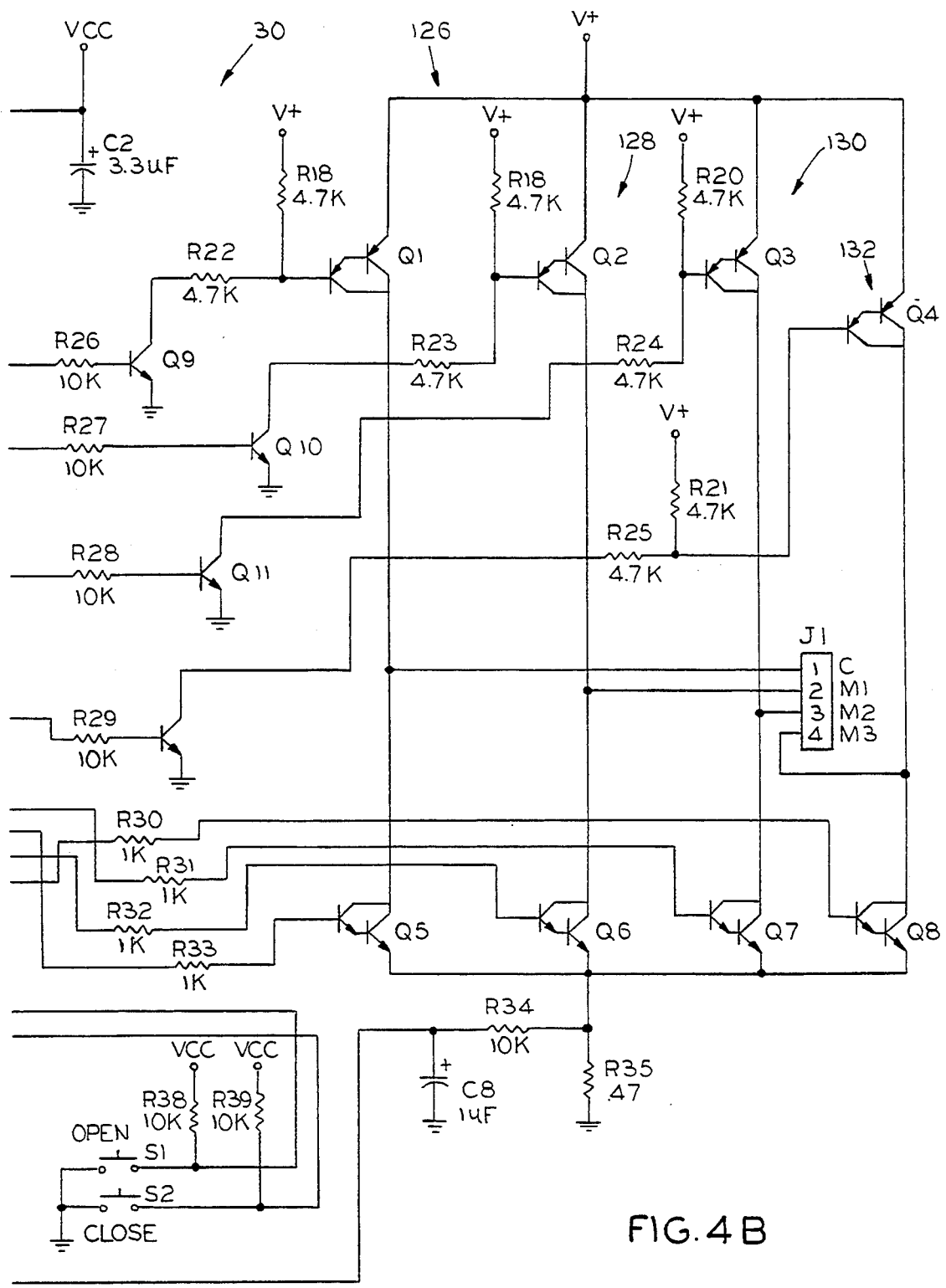

Referring to FIG. 4, an electrical schematic illustrates the circuit used for the control unit 30. Input power is received at terminals W1 and W2 being connected to the transformer 86, see FIG. 2. The terminals W1 and W2 are connected to a power supply circuit 120 including a full wave bridge rectifier 122 developing unregulated DC voltage at a node labeled V+. The rectifier 122 is also connected to a voltage regulator circuit chip U1 for developing regulated DC voltage at a node labeled VCC.

All logic functions in the control unit 30 are implemented in a microcontroller U2. In the illustrated embodiment of the invention, the microcontroller U2 comprises a Motorola 68HCOSP9 microcontroller containing on-board program memory and an internal 8-bit analog to digital converter.

A plurality of command inputs are received by the microcontroller from various sources. Manual commands come from switch contacts S1 and S2 associated with the rocker switch 32, see FIG. 1. The switch contact S1 is closed to manually command that the window be opened. The switch contact S2 is closed to manually command that the window be closed. The status of each switch contact S1 and S2 is scanned by the microcontroller U2.

The microcontroller U2 is also connected to input terminals W3, W4, W5 and W6, each for connection to remote devices. The terminal W3 is a remote open input for connection to an external momentary switch for receiving a remote open command to move the window to a select desired open position. The terminal W4 is a remote close input for connection to an external momentary switch for receiving a remote close command to move the window to the closed position. The terminal W5 is provided for connection to an external maintained switch for receiving an auxiliary command to move the window to the closed position or a select desired open position according to a change in state of the maintained switch. The W6 terminals is a common or return line for the above inputs. Referring also to FIG. 4, the W3 and W4 terminals would be connected to any of the devices which operate in a momentary contact mode, such as the X-10 relay module 72 and the modules 66 and 68, depending on their configuration. The auxiliary terminal W5 could be connected to the thermostat or the X-10 relay module 70.

An output terminal W7 is connected to a switch circuit 124 controlled by the microcontroller U2. The output terminal W7 goes high when the microcontroller U2 determines that all windows connected to it are closed. Any time the windows are not all closed, the switch 124 is operated so that the output terminal W7 is driven low.

The microcontroller U2 includes outputs for driving four half bridge circuits, 126, 128, 130 and 132. The bridge circuits 126, 128, 130 and 132 are connected between the unregulated supply V+ and ground and to an output terminal block J1, which defines the outputs C, M1, M2 and M3. Particularly, the first half bridge circuit 126 is connected to the common terminal C. The second half bridge circuit 128 is connected to the first motor output MI. The third half bridge circuit 130 is connected to the second motor output M2. Finally, the fourth half bridge circuit 132 is connected to the third motor output M3. Thus, the first half bridge circuit 126 is common to all three motors. Each of the three other half bridge circuits 128, 130 and 132 are used to drive one of the three motors that may be connected to the terminal block J1. These circuits are necessary to provide bipolar power to drive the connected motors in either direction.

Each half bridge circuit 126, 128, 130 and 132 includes a respective PNP Darlington transistor Q1, Q2, Q3 and Q4 for connection to the high side supply V+. Each is driven by a respective NPN transistor Q9, Q10, Q11 and Q12 driven by the microcontroller U2. The low side of each half bridge circuit 126, 128, 130 and 132 uses a respective NPN Darlington transistor Q5, Q6, Q7 and Q8 driven by the microcontroller U2.

In order to energize any motor output to drive its connected motor in one direction, the common output C must be connected to ground as by biasing the first half bridge circuit transistor Q5 while turning on the transistor Q2, Q3 or Q4 of one of the other half bridge circuits 128, 130 and 132, respectively. To operate any such motor in the reverse direction, opposite polarity must be applied by energizing the first half bridge circuit transistor Q1 and turning on one of the transistors Q6, Q7 or Q8 of one of the other half bridge circuits 128, 130 or 132, according to which motor is to be energized.

Motor current is sensed by a resistor R35 connected between the transistors Q5-Q8 and ground. The junction with the resistor R35 is in turn connected through a resistor R34 to the microcontroller U2. As mentioned above, analog to digital conversion is provided directly in the microcontroller U2.

When a user installs the control unit 30, it is necessary to set a jumper J2 for the type of window used. The jumper J2 includes terminals 1, 2 and 3. The jumper J2 is used to select casement, awning or skylight window operation. If a casement window, the a jumper connects pins 1 and 2 to provide window open preset set points of 33% and 66% and a closing torque of twenty-five inch pounds. Awning window operation, selected by using now jumper, provides preset open set points of 33% and 66% and a closing torque of forty inch pounds. Skylight window operation, selected by jumpering pins 2 and 3, provides preset open set points of 33% and 66% and a closing torque of twenty inch pounds and an opening torque of forty-five inch pounds.

Figure 5:
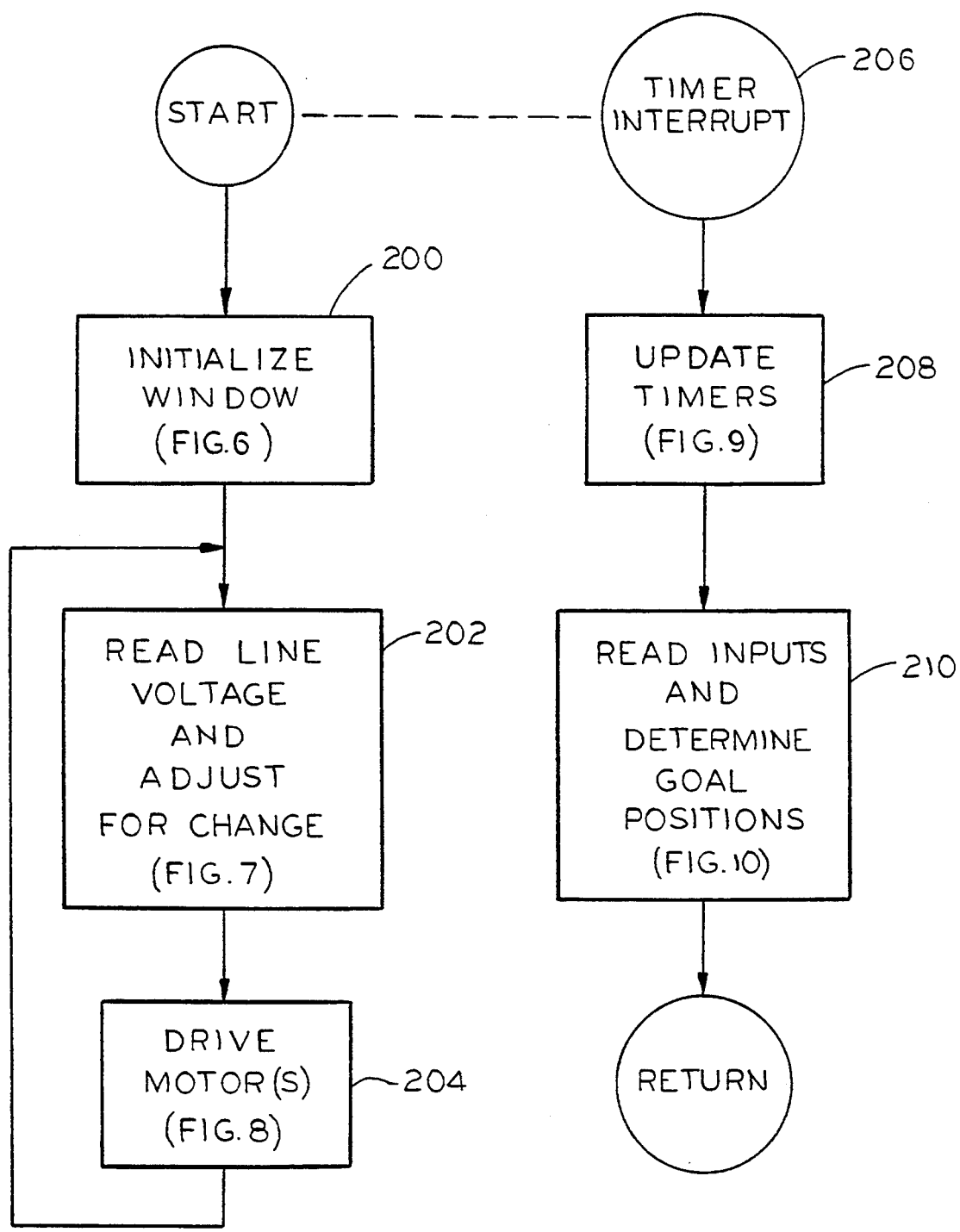
FIGS. 5–10 comprise a series of flow diagrams illustrating operation of a control program implemented by the microcontroller of the circuit of FIG. 4.

With reference to FIGS. 5-10, a series of flow charts illustrate a program implemented in the microcontroller U2 for controlling the motorized window system. FIG. 5 illustrates a flow diagram for a main control loop, with the remaining flow diagrams illustrating indicated portions thereof.

Figure 8:
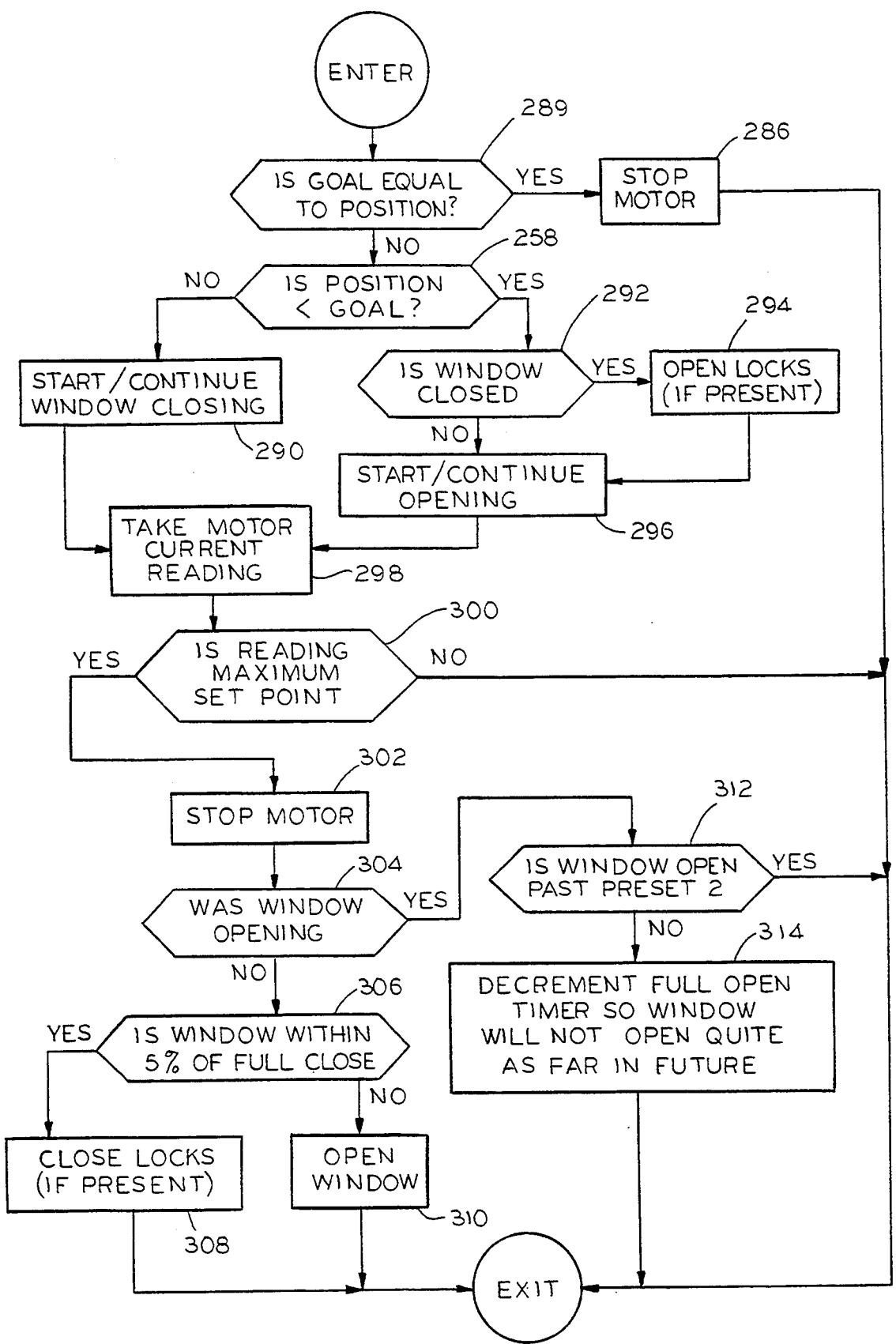

At power-up, the control initially implements an initialize window routine at a block 200. This routine is described below with respect to FIG. 6. The control then implements a read line voltage and adjusts for changes routine at a block 202. This routine is described below relative to the flow diagram of FIG. 7. Then a drive motor(s) routine is implemented at a block 204. This routine is illustrated in FIG. 8. Control then normally returns to the block 202, although under certain instances the control may return to the block 100 to again perform initialization, as discussed below.

Figure 9:
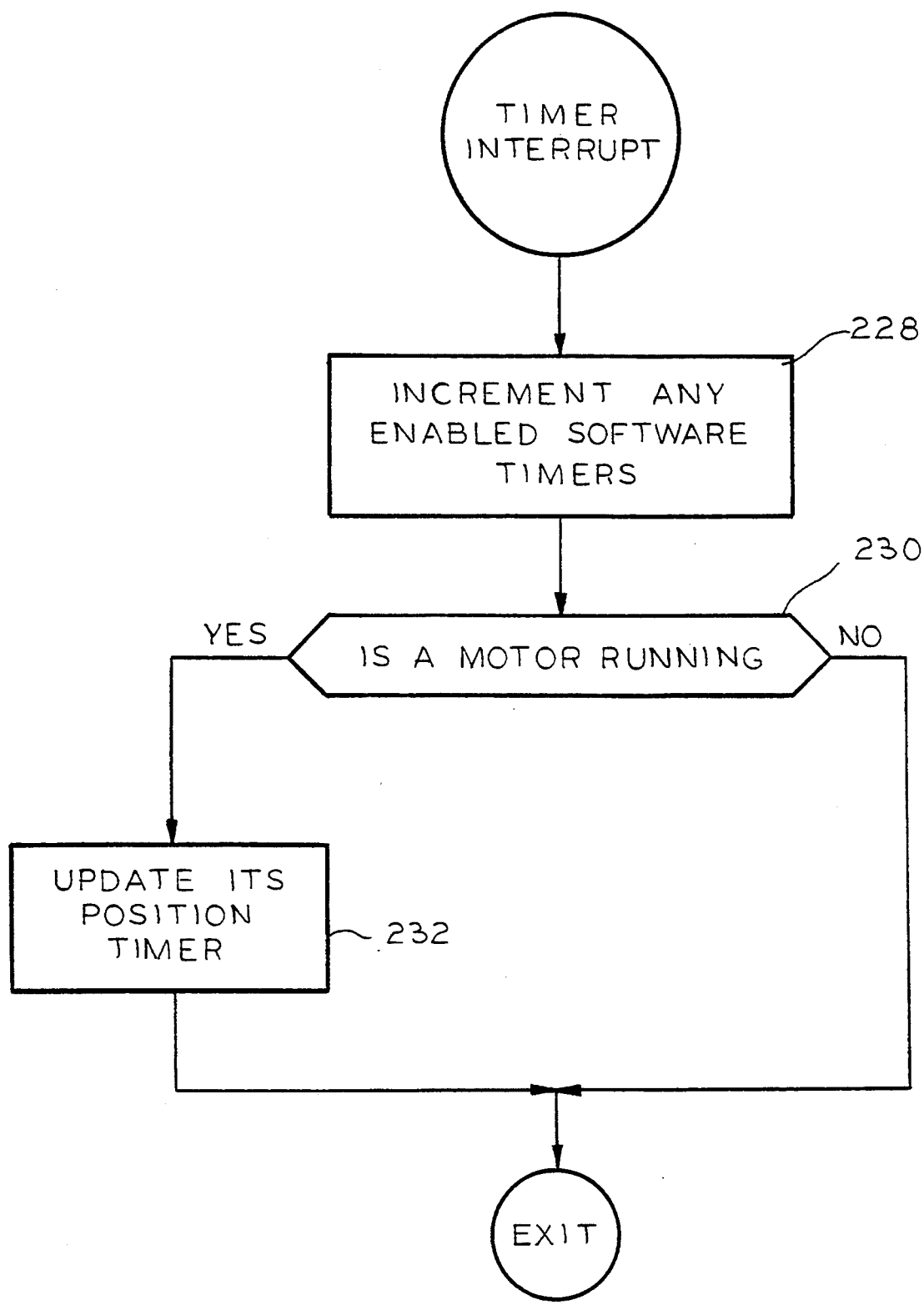
Figure 10A:
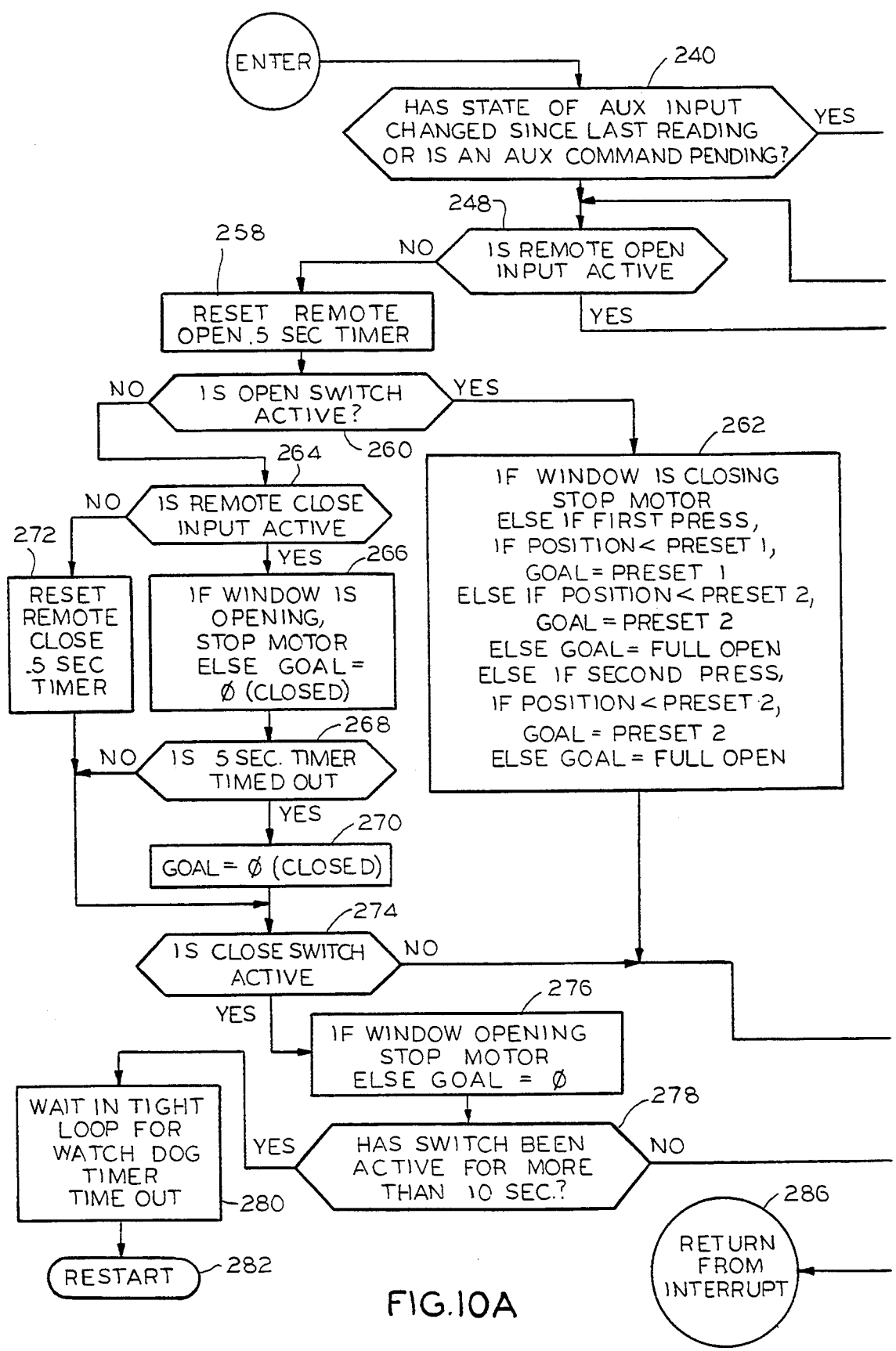
Figure 10B:
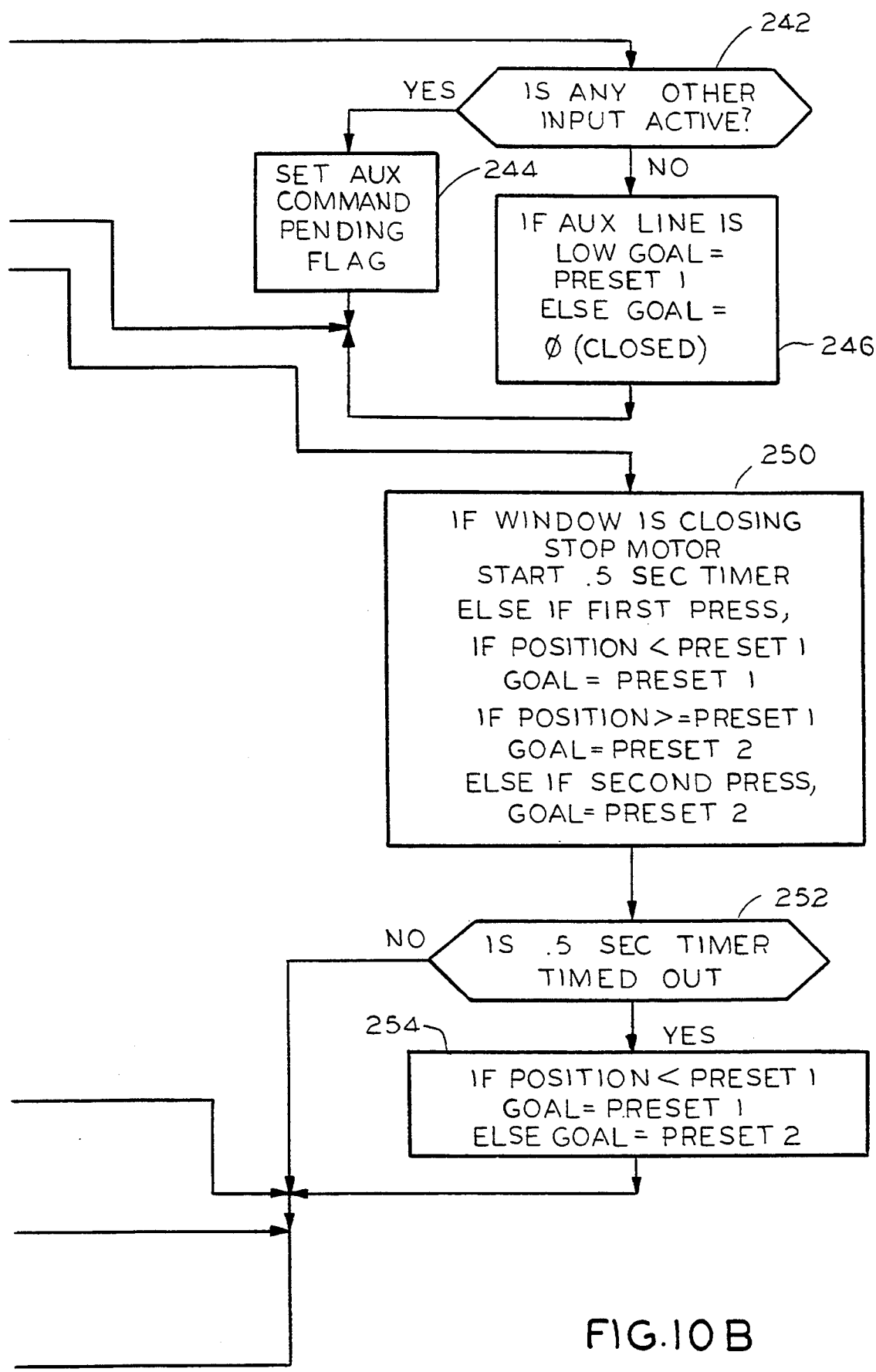

A block 206 relates to a timer interrupt service routine which is performed as a background operation concurrently. This routine initially performs an update timers routine at a block 208. This routine is illustrated in FIG. 9. Then, a read inputs and determine a goal positions routine is implemented at a block 210. This routine is illustrated at FIG. 10. The timer interrupt routine then ends.

Figures 6, 7:
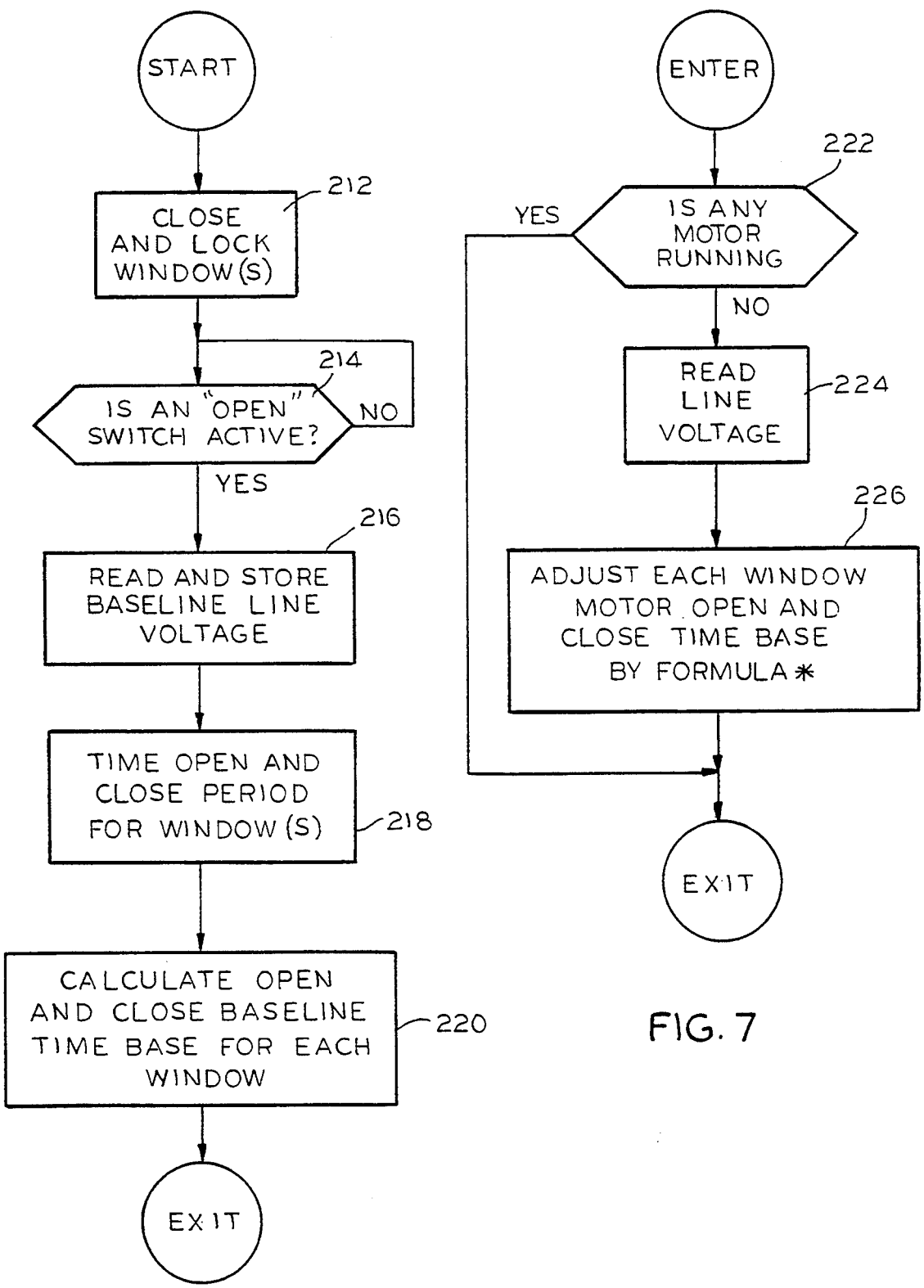

With reference to FIG. 6, the initialize window routine is illustrated. This routine is performed only at power-up or by user request, as discussed below. However, this routine is not performed fully until an open command is received to open the window.

The routine begins at a decision block 212 which closes and locks the window(s). Particularly, this routine is operable to close any and all windows and close any locks, as necessary. As part of this block, the control checks if a jumper is absent to indicate that it should use a higher closing torque for awning windows, which have no locks, to guarantee a tight weatherseal. The control then initially energizes the first window output M1 to close the window connected thereto and thereafter closes the other windows or closes the locks, as necessary. A decision block 214 then determines if any "open" switch is active, indicating a command to open the window. If not, then control loops back until an open command is received.

Once an open command is received, then the line voltage is read and stored as a baseline voltage value at a block 216. This voltage is then to be considered the normal voltage used for a timer adjust routine, as discussed below. A decision block 218 then is operable to open and close each window sequentially. In this sequence, the M3 output motor is controlled first and subsequently the M2 output motor, so that any locks are opened prior to attempting to open a window. A decision block 212 then determines the open and close baseline time for each window. This represents the amount of time to traverse from a full close position to a full open position and back to a full close position. This baseline time is then used in a timer routine for determining window position based on length of time which any motor is operated for each particular window. This routine then ends.

The control unit 30 does not use direct positional sensing. Instead, for economy, the control measures the time to traverse from full open to full closed and vice versa, with this time being used to indicate position. For example, if ten seconds is normally required to open the window and the output is energized five seconds, then it is assumed that the window is half open. While open and close times are generally similar for casement or awning type windows, the close time is generally shorter for a skylight window. Therefore, each time must be measured separately.

With reference to FIG. 7, a flow diagram illustrates the read line voltage and adjust for changes routine. This routine begins at a decision block 222 which determines if any motor is running. If not, then the line voltage is read at a block 224. A block 226 then adjusts each window motor open and close time base at a block 226 in accordance with the following equation:

$$\text{Time Base} = \frac{\text{Baseline Line Voltage}}{\text{Read Line Voltage}} \times \text{Baseline Time Base}$$

Particularly, the time base effectively defines a select rate of position change relative to time. This formula is operable to adjust this select rate in accordance with motor voltage. The rate is decreased in response to decreases in sensed voltage and increased in response to increases in sensed voltage. From the block 226, or if the motor was running, as determined at the decision block 222, then the routine ends.

Prior to discussing the drive motors routine of FIG. 8, the timer interrupt sequence is described beginning with the flow chart of FIG. 9 which illustrates the update timers routine. This routine begins at a block 228, which increments any enabled software timers. A decision block 230 then determines if any motor is running. If not, then the routine ends. If so, then the position timer for the particular motor is updated at a block 232. Particularly, this timer is updated in accordance with the adjusted time base determined in FIG. 7. The position timer stores a value representing actual position, corresponding to time of operation of a motor multiplied by the adjusted base time rate for storing instantaneous actual position.

The read inputs and determine goal positions routine is illustrated in FIG. 10. This routine is operable to determine the goal or desired position of the controlled window(s) at any given time. This routine begins at a decision block 240, which determines if the state of the auxiliary input at the terminal WS, see FIG. 4, has changed since the last reading or if an auxiliary command is pending. If so, then a decision block 242 determines if any other input is active. If so, then an auxiliary command pending flag is set at a block 244. If not, then if the auxiliary line is low, the goal is set to the first preset open set point value. Otherwise, the goal is set equal to zero to close the window.

From either block 244 or 246 or if the condition of the block 240 is false, then control proceeds to a decision block 248 which determines if the remote open input at the terminal W3 is active, i.e., high. If so, then control proceeds to a function block 250. At the function block 250, the control determines if the window is closing and, if so, stops the motor and starts a one-half second timer. Otherwise, if the remote open input was active for the first time and the current position is less than the first preset value, then the goal is set to the first preset value. If the actual position is greater than or equal to the first preset value, then the goal is set equal to the second preset value. Otherwise, if the remote open input is active for the second time, then the goal is set to the second preset value. A decision block 252 then determines if the half-second timer has timed out. If not, or the timer was not started, then the routine ends. If so, then at a function block 254 the control determines if the current position is less than the first preset value and, if so, sets the goal equal to the first preset value. Otherwise, the goal is set equal to the second preset value and the control returns from the interrupt at a node 256.

Returning to the decision block 248, if the remote open input is not active, then the remote open half-second timer is reset at a block 258 and a decision block 260 determines if the open switch S1 is active. If so, then control proceeds to a function block 262. The function block 262 determines if the window is closing and, if so, stops the motor. Otherwise, if the switch S1 was pressed for the first time and the position is less than the first preset, then the goal is set equal to the first preset value. Otherwise, if the actual position is less than the second preset value, then the goal is set equal to the second preset value. Otherwise, the goal is set to full open. Otherwise, if the switch S1 is pressed for the second time and the position is less than the second preset value, then the goal is set equal to the second preset value. Otherwise, the goal is set to full open. Control then returns from the interrupt at the node 256.

Returning to the decision block 260, if the open switch S1 is not active, then a decision block 264 determines if the remote close input at the terminal W4 is active, i.e., high. If so, then a function block 266 determines if the window is opening and, if so, stops the motor. Otherwise, the goal is set equal to zero to close the window. A decision block 268 then determines if the half-second timer has timed out. If so, then the goal is set equal to zero at a block 270. Returning to the decision block 264, if the remote close input is not active, then the remote close half-second timer is reset at a block 272. From either the block 270, the block 272 or if the half-second timer is not timed out at a decision block 268, then control proceeds to a decision block 274 which determines if the close switch S2, see FIG. 4, is active. If not, then control proceeds to the node 256 and the routine ends. If the close switch S2 is active, as determined at the decision block 274, then a function block 276 stops the motor if the window is opening and otherwise sets the goal equal to zero. A decision block 278 then determines if any switch has been active for more than ten seconds. If not, then the routine ends. If so, then this indicates a desire to perform the initialization routine. This is done by advancing to a block 280, which waits in a fight loop for the watchdog timer to time out. The control is then restarted as by returning to the initialize window routine of FIG. 6 as by restarting at a node 282.

The above routine is operable to determine which, if any, received command has priority and develop a desired position command or goal therefrom. With a remote open command, if the window is not open to the first preset position, then one contact closure causes the window to open to the first preset position. Two contact closures causes the window to open to the second preset position. If the window is open to at least the first preset position, one or two closures cause the window to open to the second preset position. A closure must be at least fifty milliseconds in duration. In order to use this input with PLC modules, a closure of at least one-half second causes a closing window to both stop, and reverse direction. The PLC module should be set for momentary operation. If a contact is closed and held, the window is driven to the second preset position. No close command can override this to allow the connection of a smoke alarm to vent smoke in the event of fire.

The remote close command causes the window to be driven closed when a contact closure is received. Again, a closure of at least 50 milliseconds is required. In order to use this input with a PLC module, a closure of at least one-half second causes an opening window to stop, and reverse direction. If a contact is closed and held, a window opens only while an open input is held active. As soon as the open input goes inactive, the window closes. This feature, called close and hold, is used to secure the window so that an automatic operating control device does not cause the window to open when the building is secured.

The auxiliary command is intended for connection to a thermostat or single contact control device. When the contact is closed, the window opens to the first preset position. When the contact is open, the window closes. This input responds to transitions and is held pending by any other active input. As a result, if the remote close input command is held active by a rain sensor, and the contact connected to the auxiliary input closes, nothing happens. When the remote close input goes inactive, the window opens.

Once a goal has been set, representing desired window position, then this goal can be used by the drive motors routine of FIG. 8. This routine is operable to sequentially power the output devices in accordance with the user input set point or preset commands, as represented by the stored goal. This flow diagram illustrates operation for a single window operator including motorized locks. If locks are not present, then the blocks related thereto are ignored. If multiple window operators are included, then the routine is used sequentially to open or close the motor connected to the M1 output, then fully open or close the motor connection to the M2 output, and then fully open or close the motor connection to the M3 output, with only one being energized at a time. Thus, the routine would be fully implemented three times if three motorized operators were used.

The routine begins at a decision block 284, which determines for the particular motorized operator if the goal is equal to the current position. If so, then the motor is stopped by de-energizing its output at a block 286 and the routine ends. If not, then a decision block 288 determines if the position is less than the goal. If not, indicating that the window should be closed, then a block 290 starts or continues window closing. If the position is less than the goal, then a decision block 292 determines if the window is closed. If so, and locks are present, then the locks are opened at a block 294. Thereafter, at a block 296, the control either starts or continues opening of the window. As discussed above, the window is opened by connecting power to its connected output M1, M2 or M3, and closed by connected opposite polarity power to its connected output M1, M2 or M3.

From either block 290 or 296, a block 298 takes a motor current reading. This is done to sense an increase in motor current, indicating that a full open or closed position has been reached. A decision block 300 determines if the read current value is greater than the stored maximum torque set point value for the particular type of motor. This block also determines if motor current goes to zero in the event that a motorized lock includes a switch contact, such as the contact 96 of FIG. 2, connected in series with the motor 90. This block also determines if the opposite switch contact is pressed. For example, if the window is currently opening and the closed switch contact S2 is pressed. If none of these events occur, then the routine ends so that the motor operation continues. If any of these three events occur, then the associated motor is stopped at a block 302. A decision block 304 then determines if the motor was opening. If not, meaning that the window was closing, then a decision block 306 determines if the window is within five percent of the full closed position. If so, then any locks present are closed at a block 308 and the routine ends. If the window is not within five percent of the full closed position, then the increase in current was likely due to some obstruction preventing full closing of the window. Thereafter, at a block 310, the window is opened for the user to attempt to eliminate any such obstruction. The routine then ends.

From the block 304, if the window was opening, then a decision block 312 determines if the window is open past the second preset position. If so, then the routine ends. If not, then the second preset set point value is decremented at a block 314 so that the window would not open as far in the future. Particularly, as window hardware wears it is generally more difficult to operate in the most open part of its travel. If this occurs, then the controller decreases the amount of opening slightly if a current rise causes stopping of the motor before reaching the second preset position. This can extend the life of worn hardware.

Thus, in accordance with the invention there is provided an economical control for controlling multiple motorized window operators or a motorized window operator with locks. The control includes in software a position sensing routine which is self-adjusting in accordance with changes in line voltage. Further, the control prioritizes among different input commands for opening and closing the window to achieve a desired hierarchy of operation.

The disclosed embodiment of the invention is illustrative of the broad concepts comprehended by the inventors.

I claim:

1. In a window operator having an electrically controlled drive for moving a window between open and closed positions in response to a command, the improvement comprising:
   means for commanding movement of the drive to move the window to a select desired position between the open and closed positions;
   position sensing means for sensing actual position of the window between the open and closed positions, comprising a timer means for storing a value representing actual position, the value being selectively incremented or decremented at a select rate in response to duration of operation of the drive to move the window between the open and closed positions;
   supply sensing means for sensing electrical power supplied to the drive;
   adjustment means operatively associated with said position sensing means and said supply sensing means for adjusting the select rate of said timer means in response to electrical power deviating from a select desired power level; and a control coupled to said commanding means and said position sensing means including comparing means for comparing said desired position to said actual position and output means coupled to said drive for developing an electrical signal to control said drive responsive to a difference between said select and actual positions to minimize said difference.

2. The improvement of claim 1 wherein said drive comprises a motor controlled drive.

3. The improvement of claim 2 wherein said output means comprises a bridge circuit for controlling polarity of power supplied to the motor dependent on desired direction of movement of the window.

4. The improvement of claim 1 wherein said adjustment means decreases the select rate in response to decreases in sensed power and increases the select rate in response to increases in sensed power.

5. The improvement of claim 1 wherein said supply sensing means senses line voltage supplied to the drive.

* * * * *